(12) United States Patent
Babej (10) Patent No.: US 7,681,298 B2
(45) Date of Patent: Mar. 23, 2010

(54) METHOD FOR THE MANUFACTURE OF A COMPONENT ASSEMBLY COMPRISING A SHEET METAL PART AND A FUNCTIONAL ELEMENT ATTACHED TO IT, A SHEET METAL PART AND ALSO FUNCTIONAL ELEMENT

(75) Inventor: Jiri Babej, Lich (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 537 days.

(21) Appl. No.: 11/159,927

(22) Filed: Jun. 23, 2005

(65) Prior Publication Data
US 2005/0286970 A1 Dec. 29, 2005

(30) Foreign Application Priority Data
Jun. 23, 2004 (DE) .................. 10 2004 030 223
Sep. 9, 2004 (DE) .................. 10 2004 043 688

(51) Int. Cl.
*B23P 11/00* (2006.01)
(52) U.S. Cl. .................. 29/524.1; 29/523; 29/525.06
(58) Field of Classification Search .................. 29/505, 29/512, 521, 522.1, 523, 524.1, 525.01, 525.06
See application file for complete search history.

(56) References Cited

U.S. PATENT DOCUMENTS

| | | | | |
|---|---|---|---|---|
| 1,513,637 A | * | 10/1924 | Schwartz | 285/204 |
| 2,318,950 A | * | 5/1943 | Larmour | 24/11 F |
| 3,481,026 A | * | 12/1969 | Lindesmith et al. | 29/516 |
| 4,557,651 A | * | 12/1985 | Peterson | 411/181 |
| 4,924,584 A | * | 5/1990 | Harney | 29/509 |
| 4,974,274 A | * | 12/1990 | Compton et al. | 470/11 |

(Continued)

FOREIGN PATENT DOCUMENTS

DE 597 773 A 5/1934

(Continued)

OTHER PUBLICATIONS

German Search Report dated May 24, 2005.

(Continued)

*Primary Examiner*—Jermie E Cozart
*Assistant Examiner*—Christopher M Koehler
(74) *Attorney, Agent, or Firm*—Hershkovitz & Associates, LLC; Abraham Hershkovitz; Eugene C. Rzucidlo (57) ABSTRACT

A method for the manufacture of a component assembly comprising a sheet metal part and a functional element attached to it by a riveting process or by a riveting and piercing process or by a press-in process, wherein the sheet metal part is provided with an imprint, is wherein the imprint is produced prior to attachment of the functional element and consists of a sequence of regions which are raised and recessed relative to one another and wherein, during the attachment of the functional element this is pressed against the sheet metal part in such a way that the imprint of the sheet metal part leads to a complementary shaping of the functional element in the region of the functional element which comes into contact with the imprint. A sheet metal part and a functional element are also claimed.

22 Claims, 8 Drawing Sheets

U.S. PATENT DOCUMENTS 5,251,370 A * 10/1993 Muller et al. .................. 29/512
5,335,411 A * 8/1994 Muller et al. .................. 29/512

FOREIGN PATENT DOCUMENTS

| | | |
|---|---|---|
| DE | 34 47 006 A1 | 7/1985 |
| DE | 34 47 006 C2 | 7/1985 |
| DE | 196 39 007 A1 | 3/1998 |
| DE | 197 56 469 A1 | 6/1999 |
| EP | 0 198 624 A1 | 10/1986 |
| EP | 0 537 793 A1 | 5/1993 |
| EP | 0 539 793 B1 | 5/1993 |
| EP | 0 678 679 A1 | 10/1995 |
| EP | 0 678 679 B1 | 10/1995 |
| EP | 0 958 100 B1 | 11/1999 |
| EP | 0 993 902 A2 | 4/2000 |
| EP | 0 993 902 A3 | 4/2000 |
| EP | 1 116 891 A1 | 7/2001 |
| EP | 1 202 834 B1 | 5/2002 |
| EP | 1 346 160 B1 | 9/2003 |

OTHER PUBLICATIONS

English Language translation of German Search Report dated May 24, 2005.
German Search Report dated Dec. 15, 2004.
English Language translation of German Search Report dated Dec. 15, 2004.

* cited by examiner

METHOD FOR THE MANUFACTURE OF A COMPONENT ASSEMBLY COMPRISING A SHEET METAL PART AND A FUNCTIONAL ELEMENT ATTACHED TO IT, A SHEET METAL PART AND ALSO FUNCTIONAL ELEMENT

BACKGROUND OF THE INVENTION

The present invention relates to a method for the manufacture of a component assembly comprising a sheet metal part and a functional element attached to it by a riveting process or by a riveting and piercing process or by a press-in process, wherein the sheet metal part is provided with an imprint. Furthermore the invention relates to a sheet metal part as well as to a functional element which are suitable for use in the method.

A method of the initially named kind is known from the European Patent 0 539 793 and is described there with a functional element in the form of a rivet nut. There a sheet metal part is provided with a stamped formation or imprint in the form of a ring-like collar around a pre-pierced hole and a cylindrical rivet section of the functional element is introduced into the stamped hole from the side of the ring collar which projects beyond the plane of the sheet metal part so that a ring-like contact surface of the functional element which forms the transition between the body of the nut element and the cylindrical art comes into contact against the end face of the ring-like collar. Triangular, nose-like ribs providing security against rotation are provided in the transition region between the ring-like contact surface and the cylindrical rivet section. Following this the nut element is pressed against the sheet metal part so that the cylindrical rivet section is formed by means of a die button arranged below the sheet metal part into a rivet bead and the ring-like collar which has a conical shape is pressed at least partly flat. In this way the diameter of the pierced hole is reduced and the outer diameter of the rivet section simultaneously enlarged so that a considerable "stranglehold" takes place between the sheet metal part and the nut element around the rivet section. Furthermore, the noses providing security against rotation are pressed into the sheet metal material of the sheet metal part and serve for an excellent security against rotation.

A related method is also used for the attachment of so-called RND elements (European Patent 11116891) to sheet metal parts.

The fastener elements in accordance with the European Patent 0 539 793 and EP 11116891 are so-called rivet elements which are inserted into pre-pierced holes in the sheet metal part and are secured to the sheet metal part by a rivet process. It is, however, not essential to pre-pierce the sheet metal part but rather fastener elements also exist which are riveted to a sheet metal part without the rivet section of the element penetrating the sheet metal part. This is for example the case in the rivet element of EP-A-0 993 902. Furthermore, functional elements exist which are attached by a so-called riveting and piercing process to a sheet metal part. For example, the SBF bolt elements of the company Profil-Verbindungstechnik GmbH & Co. KG, which are described in the German patent specification 34 47 006 and the corresponding nut elements, which are attached by a like method to a sheet metal part, fall in this category. However, with these elements the sheet metal part is not provided with a pre-formed imprint prior to the attachment but rather the imprinting of the sheet metal part takes place during the attachment of the functional element in a first stage of the attachment method.

Furthermore, so-called press-in elements are known in the prior art which are pressed into the sheet metal part and indeed in such a way that the sheet metal part flows to a certain extent around the element and leads to a form-locked engagement of the element with the sheet metal part without an actual riveting process taking place. An example for a press-in element and a press-in process of this kind is the so-called EBF element of the company Profil-Verbindungstechnik GmbH & Co. KG which, together with the method for its attachment, is described in the European Patent 0 678 679 B and in the later European patent specification EP-B-0958100. The last-named European patent specification also describes a possibility of introducing an EBF element in self-piercing manner into a sheet metal part. The RND elements described above as rivet elements can also be introduced in self-piercing manner in the sheet metal parts, even if this is not frequently practiced.

The designation functional element is however not restricted to fastener elements but rather counts in the specialist field as a designation for a large number of other elements which satisfy specific functions and which can be secured by riveting processes, by piercing riveting processes or by press-in processes to sheet metal parts. By way of example the above-named EP-B-120234 describes amongst other things, a functional element which is secured with a piercing and riveting process to a sheet metal part, with one realization of the corresponding element taking place in the form of a so-called ball pin. The corresponding element is described in the European patent application EP-A-01989624.0, with the spherical head of this element serving to accommodate a ball socket in order, for example, to be used in a gas support strut for a motor vehicle hood or rear door. Furthermore, functional elements are known which serve as spigots for the turning of rotatable parts or are for example provided with a clip mount which serves for the clipped attachment of carpets, brake lines or cable looms in motor vehicles. Furthermore, functional elements having a fir-tree-like structure are known which can be used for lower level attachment purposes in conjunction with hollow parts which are pressed onto the fir-tree structure.

BRIEF SUMMARY OF THE INVENTION

The above explanations are intended to clarify that the present invention can be used with a large number of different functional elements and with a large number of attachment techniques which are known per se.

For many named functional elements the need exists to attach a respective element to the sheet metal part in a manner secure against rotation. A certain security against rotation can admittedly be achieved by the so-called hole friction, i.e. the security against rotation which arises through friction forces between the sheet metal part and the functional element. However, the functional element is mainly provided with features providing security against rotation, for example in the form of ribs and/or grooves in the region which, during the manufacture of the connection between the sheet metal part and the functional element, enters into contact with the sheet metal part. Such features at the functional element lead to complementary shapes at the sheet metal part and a type of toothed engagement is achieved between the functional element and the sheet metal part which ensures the security against rotation. It is also known to use an adhesive in the joint region between the sheet metal part and the functional element to generate the security against rotation and to increase the resistance against rotation.

The object of the present invention is to so further develop a method of the initially named kind that a security against rotation comes about between the sheet metal part and the functional element in a novel way and means which can also be exploited in order to achieve manufacturing advantages.

In order to satisfy this object a method of the initially named kind is provided which is characterized in that the imprint is produced prior to attachment of the functional element and consists of a sequence of regions which are raised and recessed relative to one another and in that, during the attachment of the functional element, it is pressed against the sheet metal part in such a way that the imprint of the sheet metal part leads to a complementary shaping of the functional element in the region of the functional element which comes into contact with the imprint.

In corresponding manner a sheet metal part in accordance with the invention is characterized in that the imprint is manufactured prior to attachment of the functional element and consists of a sequence of mutually raised and recessed regions.

The concept underlying the invention is thus to be seen in effecting a special type of imprinting of the sheet metal part instead of providing features to generate security against rotation at the functional element, so that the features providing security against rotation are, so to say, provided at the sheet metal part. The imprinting of the sheet metal part then leads, on attachment of the functional element, to a complementary shaping of the functional element in the region of the functional element which comes into engagement with the imprint. In this way a type of toothed connection is ensured between the functional element and the sheet metal part which ensures the required security against rotation. It is however also possible to use the imprinting of the sheet metal part in accordance with the invention with a functional element which has its own features providing security against rotation.

It is initially surprising that it is possible in this manner to bring about a security against rotation or supplementary security against rotation. In the past it was assumed that the functional elements consist of a material with a higher strength in comparison with the sheet metal part so that the concept that the softer sheet metal part could generate pronounced impressions in the harder material of the functional element was not available. It has however turned out in surprising manner that precisely this is the case. The success of this method may have something to do with the fact that through the imprinting of the sheet metal part it experiences a type of work hardening whereby the hardness of a sheet metal part, i.e. the strength of a sheet metal part is increased in comparison to the functional element, even it does not reach the strength value of the functional element. It may also have something to do with the fact that the features providing security against rotation lead locally to high surface pressures at the functional element which are sufficient during the dynamic attachment of the functional element in order to generate the complementary shape of the imprint at the functional element.

Starting from this situation it became clear to the applicants that, when this way of proceeding succeeds the sheet metal parts which have a lower strength in comparison with the functional element, it should succeed even more readily with high strength metal sheets which are increasingly being used in certain technical areas, above all in motorcar construction. This recognition also leads to the result that when using higher strength metal sheets it is not absolutely essential to use functional elements which have a higher strength in comparison to the sheet metal material. In many cases fastener elements can thus indeed be used to advantage which have a lower strength than that of the sheet metal part. This not only saves the use materials which tend to be more expensive for the manufacture of the functional elements but rather also saves costly manufacturing steps, such as the heat treatment for the materials used for the functional elements. The possibility of making use of materials for the functional elements which have a lower strength in comparison to the sheet metal material makes it possible to use screwed attachments which are less critical with respect to elongation or fracture or fatigue effects.

With appropriate dimensioning of the contact surface of the functional element it is also possible to achieve a type of attachment in which the permissible surface pressure in the region of the contact surface of the functional element is not exceeded and indeed not even when higher strength sheet metal is used.

A particular advantage of the invention can be seen in the fact that the features providing security against rotation of the functional element which were previously considered to be necessary can be either completely omitted or replaced by features providing security against rotation which are easier to manufacture, because the special imprinting of the sheet metal part leads to a significant increase of the values achievable with respect to security against rotation or is completely sufficient to ensure the required security against rotation. Through the omission of the previous need for features providing security against rotation on the functional element, or through the simplification of the features providing security against rotation, costs can be saved in the manufacture of the functional element, since the corresponding tools, frequently cold forming tools, are then subjected to less wear or have a less critical shape. The tools for the imprinting of the sheet metal part must admittedly be of more complicated design—in comparison to an imprint in the form of a ring-collar without recessed or raised regions—the additional costs are however entirely acceptable particularly since the imprinting normally takes place in the manufacturing stage of the sheet metal part in a press, which is in any event present, whereas, during the manufacture of the functional element using cold heading tools a plurality of shape giving manufacturing steps are required, so that a correspondingly large number of cold heading tools are involved.

The sequence of mutually raised and recessed regions is normally executed in ring-like manner, can however be polygonal, for example rectangular or square, if the cross-sectional shape of the functional element makes this necessary or sensible. Furthermore, the sequence could also be linear when the method of the invention is used for the attachment of rectangular elements which, for example, only require a security against rotation at two longitudinal areas or edges. In other words the invention can straightforwardly also be used with such rectangular or square functional elements, even if the sequence does not have the form of a closed ring.

The sequence of mutually raised or recessed regions can have the most diverse specific shape.

In a first variant of the invention the sequence consists of elevated regions which lead to recesses in the functional element and of surface regions recessed relative to the raised regions which lead at least substantially to no deformation at the functional element. The recessed regions are larger areawise than the recessed regions and/or each have a surface which lies at least substantially parallel to a respective region of the functional element which enters into contact with it. In contrast the raised regions can have a rounded or pointed apex. They can be circular, oval, polygonal, elongate or otherwise shaped in plan view.

In one embodiment of the recessed regions, in each case with a surface which lies at least substantially parallel to a respective region of the functional element which enters into contact with it, it can be ensured that the surface pressure forces which act there on the functional element lie below the critical value at which a deformation of the functional element arises in this region. In contrast, in the raised regions of the imprint, i.e. in the region of the rounded or pointedly convergent apices, surface pressure values can arise which lead to a complementary shaping of the functional element and in this way to the above-mentioned toothed engagement between the functional element and the sheet metal part which is necessary to ensure security against rotation. It can admittedly be the case that the raised regions of the imprint are themselves deformed by the attachment of the functional element, nevertheless this leads to a corresponding deformation of the functional element so that the desired toothed engagement is achieved. Naturally the material of the functional element which is displaced in the vicinity of the raised regions of the imprint must flow somewhere. One possibility of ensuring this lies in selecting the shaping of the functional element in such a way that regions are present where the displaced material could flow without this having a negative effect on the component assembly which arises. Finally it can also transpire that the displaced material enters into a region which lies opposite to the recessed regions of the imprint.

Furthermore, the possibility exists that the sequence consists of raised regions, which lead to recesses in the functional element and of recessed regions relative to the raised regions which lead to raised formations of the functional element.

In this embodiment the material of the functional element which is displaced by the raised regions of the imprint flow into raised formation at the functional element which are opposite to the recessed regions of the imprint. This embodiment thus also leads to a pronounced toothed engagement between the functional element and the sheet metal part.

A further possibility lies in the sequence consisting of recessed regions which lead to raised formations at the functional element and of raised surface regions raised relative to the recessed regions which lead to at least substantially no deformation of the functional element. In this embodiment it is assumed that, through the considerable attachment forces which are exerted onto the functional element during its attachment to the sheet metal part, material of the fastener element can flow plastically into regions which lie opposite the recessed regions of the imprint and lead in this manner to the desired toothed engagement between the functional element and the sheet metal part. The surfaces of the raised regions can, as previously explained, each be equipped with a surface which lies at least substantially parallel to a respective region of the functional element which comes into contact with it and which is dimensioned so large that a surface pressure arises which lies under the critical value, so that no material from these regions tends to be displaced. The possibility would however also exist of dimensioning the areas such that material from here flows into regions of the functional element which lie opposite to the recessed regions of the imprint.

Another possibility consists in the sequence consisting of raised regions which lead to recesses in the functional element and of regions recessed relative to the raised regions which lead to raised formations at the functional element and also of intermediate regions which lead to at least substantially no deformation of the functional element. In this embodiment the raised regions can have a rounded or pointedly converging convex shape and in the recessed region can have a rounded or pointedly converging concave shape.

In contrast the intermediate regions are preferably larger area-wise than the recessed regions and the raised regions and each have a surface which lies at least substantially parallel to a respective region of the functional element which enters into contact with it. The surface pressure, which arises at the functional element on attachment of the functional element to the sheet metal part lie in the region of the intermediate regions below the critical value, so that here no pronounced change of shape of the functional element occurs. An embodiment of this kind also leads to the desired toothed engagement between the functional element and the sheet metal part.

It is in no way necessary that the sequence consists of alternately arranged raised portions and recesses or of raised portions, intermediate regions and recesses etc. but rather any desired combinations could be used. For example a raised formation can be followed by two recesses and only then does a further raised formation arise or a recessed region and an intermediate region could be alternately present between two respectively adjacently disposed raised regions. Through the specifically selected arrangement a periodically repeating sequence of raised portions and recesses or of raised portions, intermediate regions and recesses will normally result during the imprinting of the sheet metal part. This is, however, not necessarily the case.

Particularly preferred variants of the method of the invention and of the sheet metal part of the invention and also of the functional element which are provided for the attachment in the manner secure against the rotation to the sheet metal part, in particular to a sheet metal part in accordance with the invention using the method of the invention, result from the further patent claims and also from the following description of preferred embodiments of the invention.

BRIEF DESCRIPTION OF THE SEVERAL VIEWS OF THE DRAWING

Such preferred embodiments of the invention will be explained in more detail in the following with reference to the drawings in which are shown.

DETAILED DESCRIPTION OF THE INVENTION

FIGS. 1A to 1D show in various representations a sheet metal part 10 for use with a functional element 12 (FIGS. 2A and 2B) attached to it by a riveting process or by a riveting and piercing process, with the component 10 being provided with an imprint 14 in the region of the attachment of a functional element. This imprint 14 manufactured prior to the attachment of the functional element consists of a sequence of regions 16 and 18 which are mutually raised and recessed. The sequence 15 is shown here in ring-form, it could however, if required, should the form of a functional element make it necessary, be polygonal, for example rectangular or square.

The imprint 14 is executed so that a ring collar 20 of sheet metal material arises and the sequence 15 is formed in the region of the transition 22 of the sheet metal material into the ring collar 20. Stated more precisely the imprint 14 is provided in the region of the radially inner side of the conical recess 24 in the sheet metal, i.e. of the corresponding conical ring surface 22 through the use of a (not shown) punch with a shape complementary to the shape of the imprint, with the sheet metal part being supported during the formation of the imprint on a corresponding die button (not shown). In this connection the ring collar can be formed in a first stage without an imprint and the imprint can first be provided subsequently or it can be manufactured simultaneously with the manufacture of the ring collar in one step.

Figure 1A:
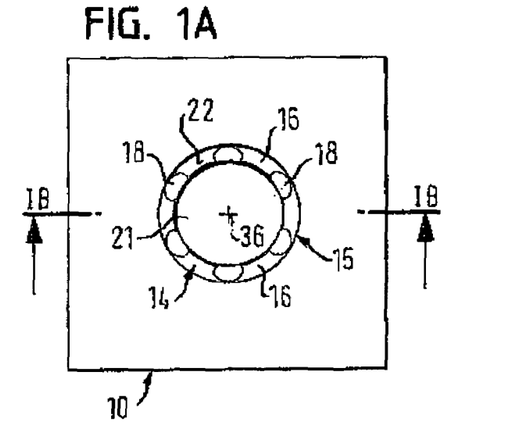
FIGS. 1A-1D a sheet metal part prepared in accordance with the invention in a plan view (FIG. 1A), a section drawing (FIG. 1B in accordance with the section plane IB-IB of FIG. 1A) and in two perspective representations from above (FIG. 1C) and from below (FIG. 1D), FIGS. 2A-2B the attachment of the functional element in accordance with the European Patent 1202834 B1 to the prepared sheet metal part of FIGS. 1A-1D, FIGS. 3A-3E an alternative sheet metal preparation in accordance with the invention in a plan view, in two sectional drawings and also in two perspective views from above and below, FIGS. 4A-4F a further sheet metal preparation in accordance with the invention in a plan view onto a part region of the sheet metal adjacent to an edge of a hole and in five different section drawings, FIGS. 5A-5D a further sheet metal preparation in accordance with the invention in a plan view onto a part region of the sheet metal adjacent to an edge of the hole and in three different sectional drawings, FIGS. 6A-6C a further alternative sheet metal preparation in accordance with the invention in a plan view onto a part region of the sheet metal adjacent to a hole edge and in two different sectional drawings, FIG. 7 a further alternative of a sheet metal preparation in accordance with the invention but only showing a part region of the margin of a pierced hole, FIG. 8 a representation similar to FIG. 7 but with a different sheet metal preparation in accordance with the invention, FIG. 9 a further drawing similar to FIG. 7 but of a yet further sheet metal preparation in accordance with the invention, FIG. 10 a sectional drawing for the illustration of a sheet metal preparation in accordance with the invention at the top side of a sheet metal part in the region of the hole edge, FIG. 11 a representation similar to FIG. 10 but of a sheet metal part with a conical upwardly projecting rim around a pierced hole, FIG. 12 a further sectional drawing of a sheet metal preparation in accordance with the invention, with the sheet metal preparation being present in the region of a conical ring collar, FIG. 13 a schematic representation in a longitudinal section through a different embodiment of the method of the invention with a functional element, with a prepared sheet metal part and with a die button for the attachment of the functional element to the sheet metal part, and FIG. 14 a sectional illustration of the component assembly which results through the attachment of the functional element of FIG. 13 to the sheet metal part shown there.
Figure 1B:
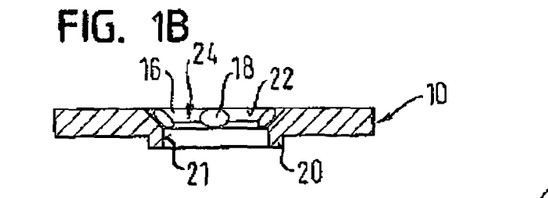
Figure 1C:
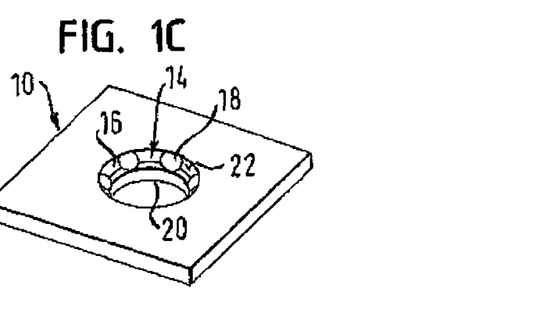
Figure 1D:
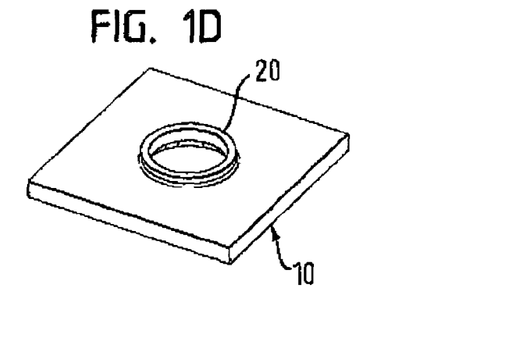
Figure 2A:
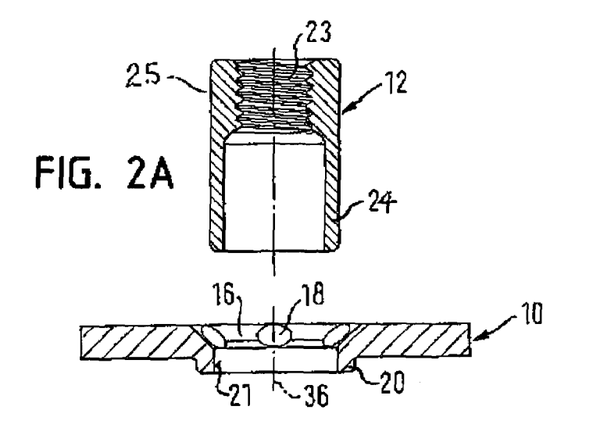
Figure 2B:
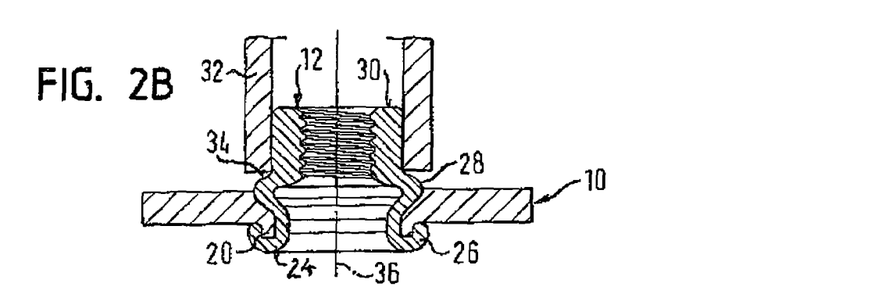
Figure 3A:
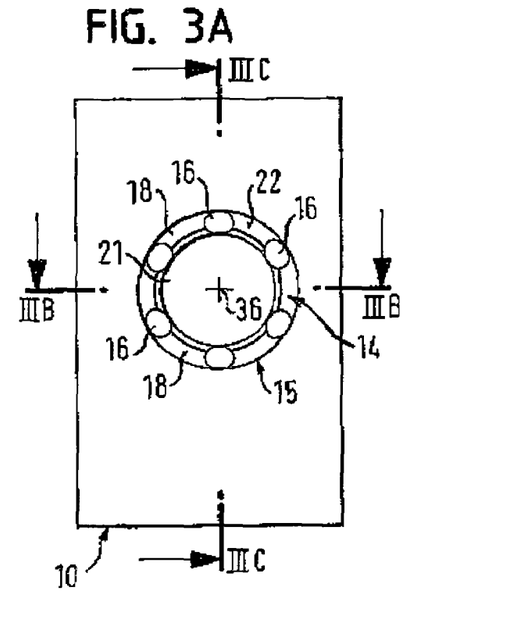
Figure 3B:
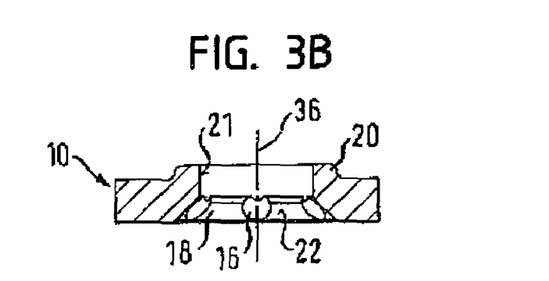
Figure 3C:
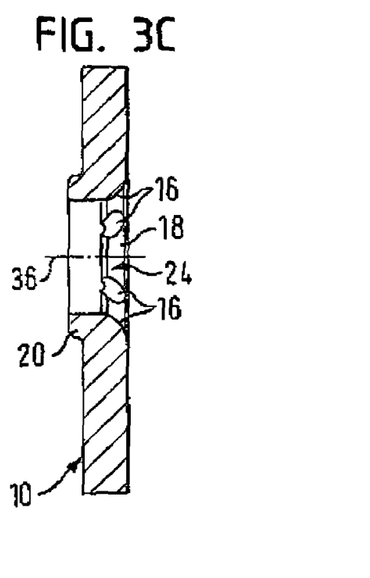
Figure 3D:
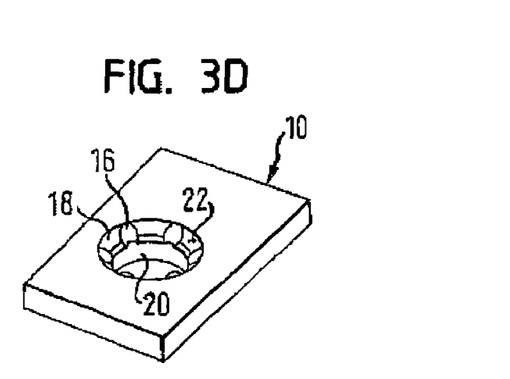
Figure 3E:
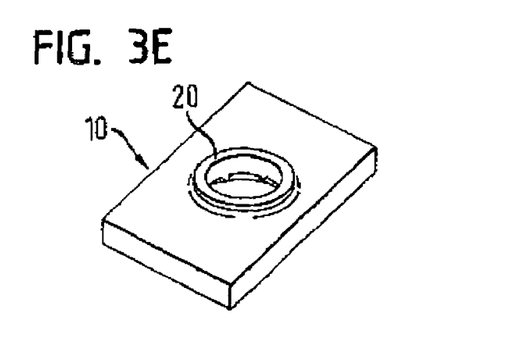

The FIGS. 2A and 2B then show the attachment of the functional element 12 to the prepared sheet metal part 10. The functional element 12 is the functional element which is described and claimed in detail in the European Patent EP 1202834 B1. In this European Patent the element 12 is used in order to pierce the sheet metal part 10, with a ring collar similar to the ring collar 20 in the sheet metal part arising during the piercing of the sheet metal part by the functional element 12, since the sheet metal part is supported on a die button having a corresponding ring recess. Thereafter, the material of the rivet section 24 at the lower end of the functional element 12 is turned outwardly by the rounded base of the ring recess in the die button into a roll collar around the ring collar 28 in order to form the rivet bead as is shown at 26 in FIG. 2B. I.e. the ring collar 20 is received by a ring-like groove which has arisen through the deformation of the lower end of the rivet section 24 of the functional element 12.

Furthermore, it is shown in EP-B-1202834, as also here, that material of the ring-like rivet section 24 above the sheet metal part is crushed into a ring fold as is shown at 28 in FIG. 2B. This leads to the material of the sheet metal part 10 in the marginal region of the pierced hole 21 being trapped in a type of ring recess of the deformed rivet section 24 of the functional element 12.

In contrast to the method described in EP-B-1202834 the functional element 12 is here guided through the pre-pierced hole 21 in the sheet metal part 10. The die button which is used during the attachment of the functional element 12 has however a shape corresponding to the shape of the die button of EP-B-1202834 and the functional element 12 is pressed in precisely the same manner from above onto the sheet metal part and the die button as is described in EP-B-1202834. However, in the present invention it is not essential for the die button to be provided with grooves or noses in the region of the punch projection or of the transition from the ring recess into the end face in order to achieve a security against rotation, because this function is achieved by the sheet metal preparation in accordance with the invention.

In the embodiments which are described in EP-B-1202834 B1 either no features providing security against rotation are used or smaller features providing security against rotation such as grooves or noses are provided in the area of the region of the functional element which forms the rivet bead. Alternatively to this it is mentioned in EP-B-1202834 that radially extending noses could be provided either in the die button for the formation of the rivet bead and/or in the end face of the punch which forms the ring fold, which then lead to a mutual deformation of the sheet metal part and of the contacting region of the rivet bead and/or of the ring fold which serve to increase the security against rotation.

In the case of the present method the security against rotation is achieved differently. This is achieved, on the one hand, by the imprinting of the sheet metal part which is produced prior to the attachment of the functional element and which consists of the sequence 15 of mutually raised and recessed regions 16 and 18 and, on the other hand, in that, on attachment of the functional element 12, this is pressed against sheet metal part such that the imprint 14 of the sheet metal part leads to a complementary shaping of the functional element in the region of the functional element which comes into contact with the imprint, i.e. in the region of the lower side of the ring fold 28. The plane of the sectional drawing in FIG. 2B is admittedly so selected that one cannot see that the material of the ring fold 28 has flowed into the recessed regions 18 of the imprint, it will however be understood, that on the attachment of the functional element the considerable crushing forces which act on the ring fold 28 will cause the sheet metal material present there to flow into the recesses 18, whereby a toothed engagement arises between the functional element 12 and the sheet metal part 10 which offers a considerable security against rotation, i.e. generates a corresponding resistance to rotation.

During the attachment of the functional element 12 forces are exerted onto the upper end face 30 of the functional element 12 as described in EP-B-1202834, initially while inner plunger (not shown), which are sufficient to form the rivet bead and to pre-form the ring fold 28. These forces do not lead to a deformation of the thread of the functional element 11 because the region of the functional element 11 with the thread 23 is made substantially thicker than the cylindrical rivet section 24 so that only the region 24 is deformed. In the last stage of the attachment process the ring fold 28 is pressed flat, i.e. pressed down further than shown in FIG. 2B and indeed by means of a tubular outer plunger 22 which, as likewise described in EP-B-1202834, moves synchronously with the non-shown inner punch and the lower end face of which presses directly against the upper side 34 of the ring fold, so that the deformation forces only act in the region of the rivet section 24 of the functional element between the cylindrical outer punch 33 and the die button provided below the rivet bead and serve for the corresponding flow behavior of the material of the rivet section 24 into the recesses 18.

Specifically the sequence 15 in this example consists of the recessed regions 18, which lead to raised formations at the functional element, i.e. in the lower region of the ring fold 28 in FIG. 2B and of surface regions 16 which are raised relative to the recess regions which at least substantially do not lead to any deformation at the functional element 12 in the region of the ring fold.

The reason why in this example the raised region 16 do not lead to any (notable) deformation in the region of the ring fold has in principle two causes. The first is that the raised regions 16 are substantially larger in area than the recessed regions 18 so that there the surface pressure forces which come into action are significantly lower and lie below the value which would lead to a deformation of the material of the ring fold. Secondly, the surface regions 16 lie during the formation of the ring fold 28 at least substantially parallel to the so-called surface of the ring fold in the region of these surface regions 16, whereby a uniform pressure distribution occurs. This also contributes to keeping the compression forces which act on the sheet metal material, on the one hand, and on the material of the rivet section 24, on the other hand, in a range which does not lead to any notable deformation. The position is naturally different for the recesses 18 because the material of the rivet section first comes into full area contact with the concave recesses 18 on completion of the attachment of the functional element to the sheet metal part.

Another basic type of sheet metal preparation, i.e. the formation of the imprint can also be considered and will subsequently be explained in more detail with reference to the FIGS. 3A to 3E. For parts which corresponds to parts of the previous Figures, the same reference numerals will be used. The previous description also applies for the corresponding parts and features so far as nothing to the contrary is stated. This also applies to the further description.

In the example of FIGS. 3A to 3E the sequence 15 consists of raised regions 16 which lead to recesses in the functional element and of surface regions 18 recessed relative to the raised regions which lead to at least substantially no deformation at the functional element.

As is evident from FIGS. 3A to 3E the raised regions 16 in this example have the same contour as the recessed regions 18 in the embodiments of FIGS. 1A-1D and FIG. 2A. In corresponding manner the recessed regions 18 in this embodiment have the same contour as the raised regions 16 in the previous embodiment. The convex shape of the raised regions 16 is in this example particularly clearly visible in the sectional drawing of FIG. 3C (section plan IIIC-IIIC of FIG. 3A) where the rounded shape can easily be seen.

The method for the attachment of a functional element to the sheet metal part 10 in accordance with FIGS. 3A to 3E takes place precisely as was described in connection with the FIGS. 2A, 2B with the exception that is now the raised convex regions 16 of the imprint 14 which form corresponding recesses in the lower side of the ring fold 28 of the functional element 12 during this attachment, whereas the regions 18 which are larger area-wise also lead here to no substantial deformation at the functional element.

The action of the raised regions 16 during the formation of the recesses in the lower side of the ring fold 28 is also pronounced because the raised regions 16 initially act over only a very small surface on material of the functional element, i.e. on the material of the rivet section 24 of the functional element during formation of the ring fold 28, so that there a high surface pressure is present which favors the formation of the recesses and the hooked engagement between the functional element and the sheet metal material. Here also the regions 18 which are larger area-wise lie substantially parallel to the local surface of the ring fold 28 of the functional element at the conclusion of the attachment process so that for this reason also the surface pressure there is if any thing low and no deformation of the functional element is to be feared.

Some further examples of sheet metal preparation in accordance with the invention will now be described.

Figure 4A:
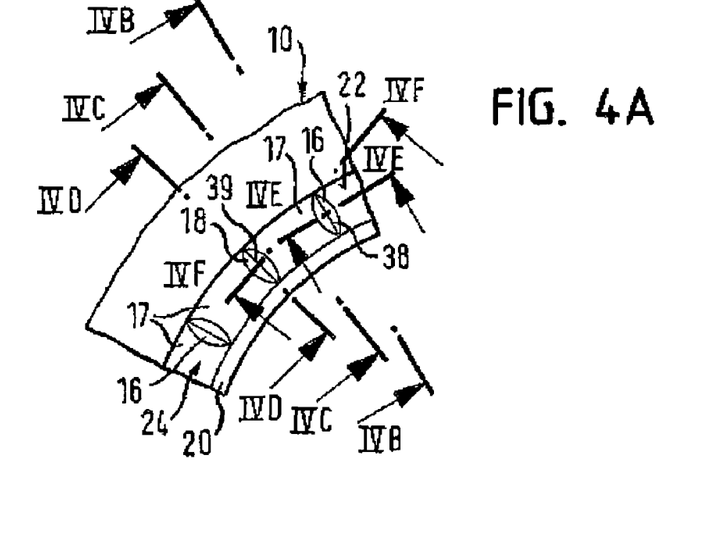

In order to simplify the representation and the drawing the sheet metal part 10 in FIG. 4A is only shown in one marginal region of the pierced hole 13 and the sheet metal part is not shown in total outline. It can however be recognized from FIG. 4A that the basic shape of the sheet metal part with ring collar 20 and with the imprint 14 in the region of the transition from the top side of the sheet metal part into the ring collar is designed in the same way as in the previous embodiments. In this example the raised regions 16 and the recessed regions 18 are alternately provided on a conical ring surface 22 and indeed with a considerable spacing between the individual raised portions and recesses which form intermediate regions 17. It is to be noted that here the raised region 16 and the recessed regions 18 have, instead of a more rounded contour as previously, a more elongate contour, but are themselves of convex or concave shape, as can be seen for example from FIGS. 4E and 4F.

Figure 4B:
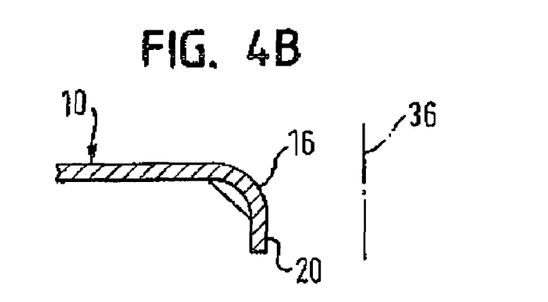
Figure 4C:
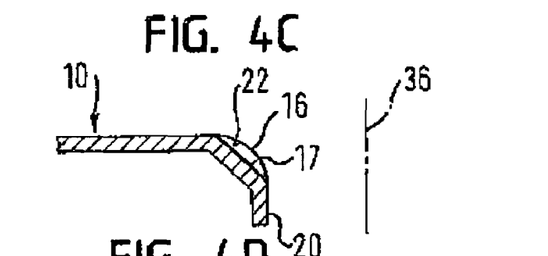
Figure 4D:
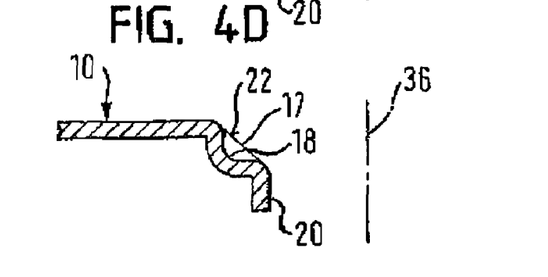
Figure 4E:
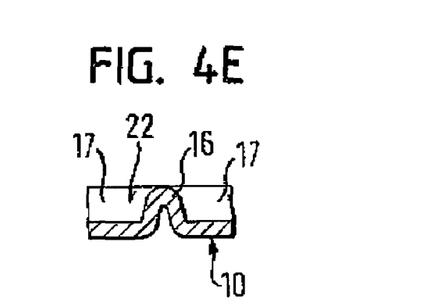
Figure 4F:
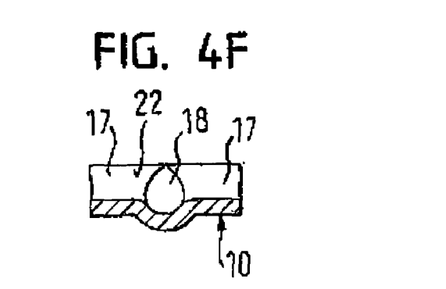
Figure 5A:
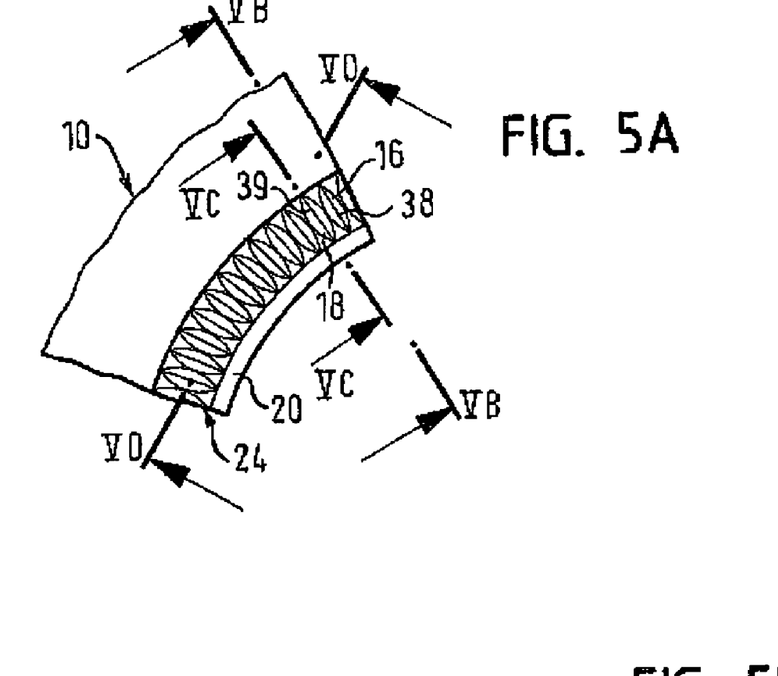
Figure 5B:
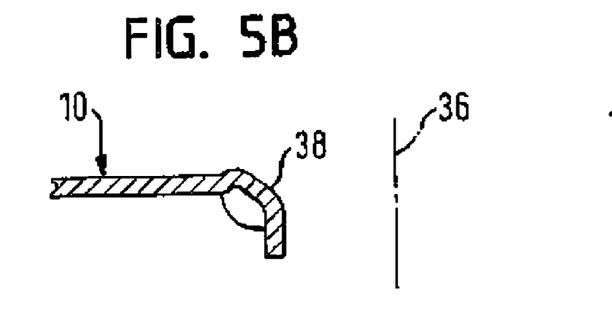
Figure 5C:
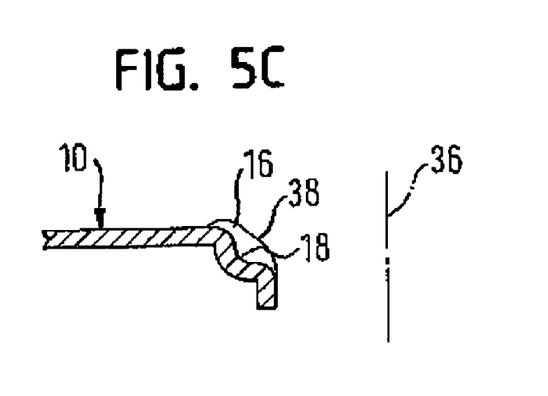
Figure 5D:
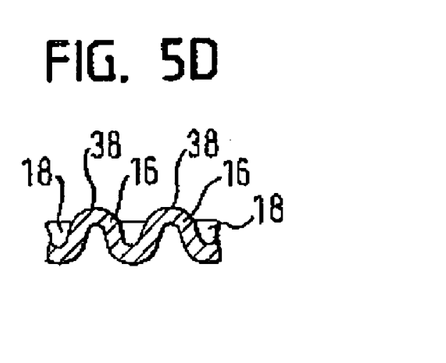

It should also be noted that the sectional drawing of FIG. 4B corresponds to the section line IVB-IVB of FIG. 4A, the section drawing of FIG. 4C corresponds to the section plane IVC-IVC of FIG. 4A and the sectional drawing of FIG. 4D is drawn in accordance with the section plane IVD-IVD of FIG. 4A. In contrast the section drawings of FIGS. 4E and 4F correspond to the section planes IVE-IVE and IVF-IVF of FIG. 4A. The section drawings of the FIGS. 4B to 4D are each shown as a half sections on the left hand side of the central longitudinal axis 36 of the pierced hole.

Two points can be recognized from FIG. 4A which have a considerable significance for the present invention. In this example the sequence 15 consists of raised regions 16 which lead to recesses in the functional element 12 and of recessed regions 18 relative to the raised regions which lead to raised formations at the functional element which are each present in the region of the lower side of the ring fold 28 of the functional element 12 in its deformed state. The second important point is to be seen in the fact that the sequence 15 does not consist here only of raised regions 16 which lead to recesses in the functional element and of recessed regions 18 relative to the raised regions which lead to raised formations of the functional element but rather also of the intermediate regions 17 which lead to essentially no deformation at the functional element 12.

Since in this example the raised regions 16 have a pronounced apex 38 it is easy to understand that they lead to recesses at the lower side of the ring fold whereby via a hooked inter-engagement of the sheet metal material and the functional element arises. Furthermore, it can be appreciated that, at the recessed regions 18 which lead to the raised regions at the functional element and which have a mirror symmetrical shape with apex 39, the material of the ring fold does not initially receive any support so that, with a flow behavior of the material of the ring fold, this material will flow into the recesses 18. Furthermore, it is evident that the intermediate regions 17 have an area which is significantly larger than the area of the raised regions 16 or of the recessed regions 18 and that these surface regions 17 lie at least substantially parallel to the lower side of the ring fold 28, so that the surface pressure is considerably lower and no significant deformation of the material of the functional element takes place there.

The raised regions 16 can have a generally rounded or pointed converging convex shape. In similar manner the recessed regions 18 can have a rounded or pointed converging concave shape.

It is however in no way required that intermediate regions be provided if a deformation of the material of the rivet section is to take place both at elevated regions 16 and also at recessed regions 18 of the sheet metal material. One possibility of achieving such a deformation is shown in FIGS. 5A to 5D. Here the raised regions 16 and the recessed regions 18 alternate directly one after the other, as it were without intermediate regions 17. One could admittedly take the view that the transitions between the raised regions 16 and the recessed regions 18 represent intermediate regions, it will however be understood that the corresponding regions 16, 18 could merge flowingly into one another, for example in the form of a wave-shaped deformation of the surface of the sheet metal part in the region of the imprint 14, i.e. the apex lines 38, 39 of the raised regions 16 and of the recessed regions 18, represent radially extending lines, as shown here, however the transitions between the convexly curved raised regions 16 and the concavely curved recessed regions 18 are flowing, i.e. are also determined by radial lines which lie in the local plane of the ring surface 22. Otherwise the shape of the raised regions 16 and of the recessed regions 18 can be seen from the FIGS. 5A to 5D.

Figure 6A:
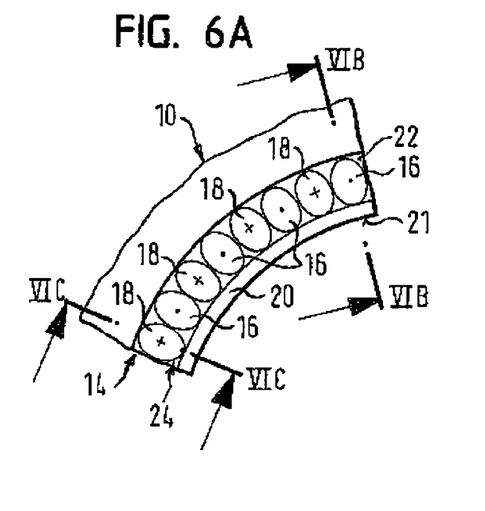
Figure 6B:
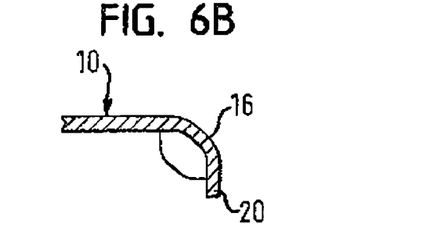
Figure 6C:
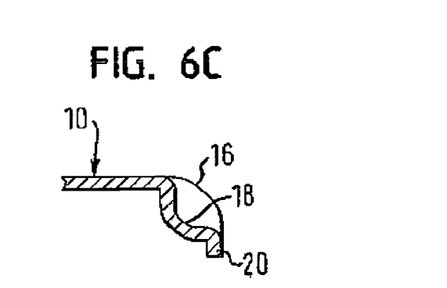

An alternative possibility for realizing the raised regions 16 and the recessed regions 18 alongside one another is shown in the FIGS. 6A to 6C. Here the corresponding recesses and raised formations again have the shape of round or slightly oval raised formations or recesses in plan view which are arranged directly alongside one another, i.e. quasi without intermediate regions.

It is evident from FIGS. 4A to 4F, and from FIGS. 5A to 5D and from FIGS. 6A to 6C that the sheet metal part is made somewhat thinner in comparison to the sheet metal part of the previous embodiments, with the imprint 14 being produced at the critical region of the sheet metal part which enters into contact with the lower side of the ring fold using tools which lead to a complementary shaping at the radially outer side of the ring collar in the region of the transition into the sheet metal part. This complementary shaping at the outer side of the transition, which is however not necessary, is not of great significance, it could however, if the shaping is really pronounced, make it necessary to use a die button to support the sheet metal part during the attachment of the functional element which likewise has a complementary shape, so that the sheet metal part is supported over its full area at the lower side.

Figure 7:
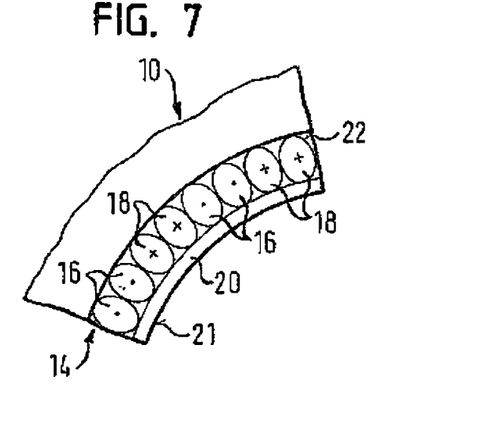

It is also in no way necessary that the sequence consists of alternating raised and recessed regions. For example, FIG. 7 shows a shaping of the individual raised regions 16 and recessed regions 18 in accordance with FIGS. 6A to 6C but in this example two raised regions 16 are arranged directly alongside one another and these are followed by two recessed regions 18 and these in turn by two raised regions 16 etc.

Figure 8:
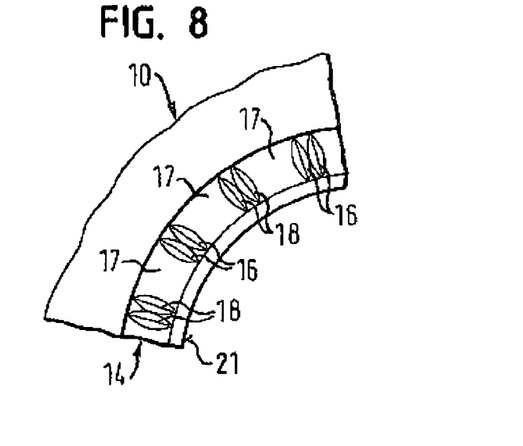

FIG. 8 shows recessed and raised regions 18 and 16 and also intermediate regions 17 with a shaping of the individual regions in accordance with FIGS. 4A to 4F but here two raised regions 16 are arranged alongside one another, these are followed by an intermediate region 17 which is in turn followed by two recessed regions, which is in turn followed by an intermediate region 17 and then by two further raised regions 16 etc.

Figure 9:
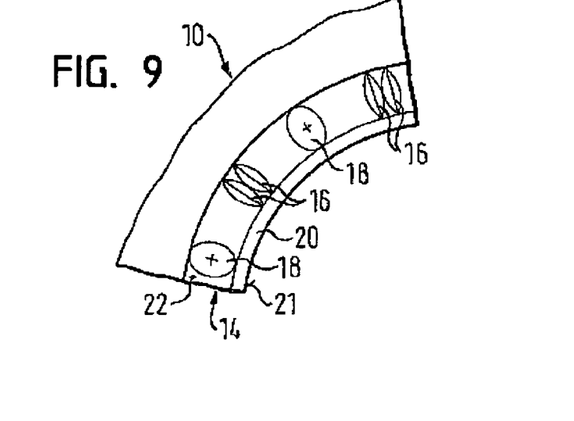

It is, however, in no way necessary that the raised regions 16 and the recessed regions 18 each have the same contour. As an example FIG. 9 shows an imprint 14 in which two raised regions 16 with a shape corresponding to the raised regions 16 of FIG. 4A lie alongside one another, are followed by an intermediate region 17 with approximately the form of the intermediate region 17 of FIG. 4A, which then merges into a recessed region 18, which is formed in accordance with the recessed regions 18 of FIG. 6A. This recessed region 18 is then followed by a further intermediate region 17 which is in turn followed by two raised regions 16 etc. Ultimately a large number of different shapings can be considered. Another possibility would for example to be provide a type of corrugation or knurling or ribbing where relatively narrow valleys and peaks are present along-side one another on a conical surface such as 22.

It is somewhat surprising that the present invention also functions when the sheet metal part has a lower strength than the functional element. This can in part lie in the fact that the material of the sheet metal part experiences cold work hardening during the formation of the imprint 14 which leads to a local increase of the strength. It however also apparently lies in the fact that the raised regions of the imprint exert a higher surface pressure at the functional element. Also dome-shaped, i.e. convex regions, have an increased stiffness, similar to a dome-shaped roof or a bridge with an arch, which are able to carry considerable vertically directed loads.

It is evident that, when the invention functions with softer sheet metals, will function better when the strength of the sheet metal part corresponds approximately to that of the functional element and even better when the sheet metal part is a sheet metal part of a higher strength sheet metal, for example a sheet metal part which has a higher strength than the functional element.

In the previous embodiments the imprint 14 is so executed, that a ring collar 20 of sheet metal material is present and the sequence 15 is formed in the region of the transition 22 of the sheet metal material into the ring collar 20.

Figure 10:
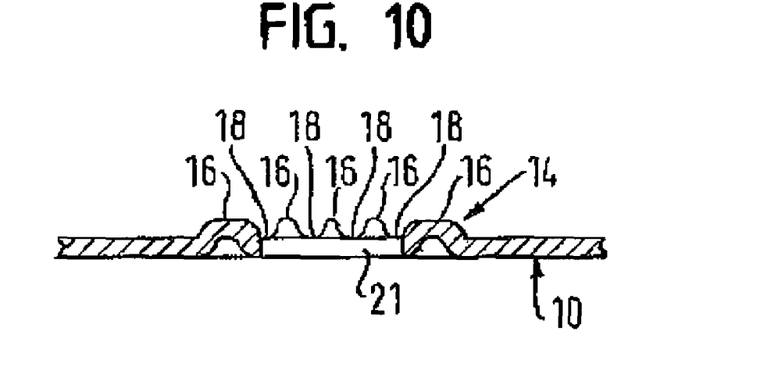

This is however not compulsory. For example, FIG. 10 shows a sheet metal part 10 with an imprint 14 which consists of raised regions 16 and recessed regions 18, with the imprint being arranged in the region of the margin of the hole in a horizontal part of the sheet metal part around the pierced hole. A sheet metal part of this kind could be used with a rivet nut known in the prior art in which the sheet metal material around the pierced hole is pressed into a recessed circular or polygonal recess of a nut element.

Figure 11:
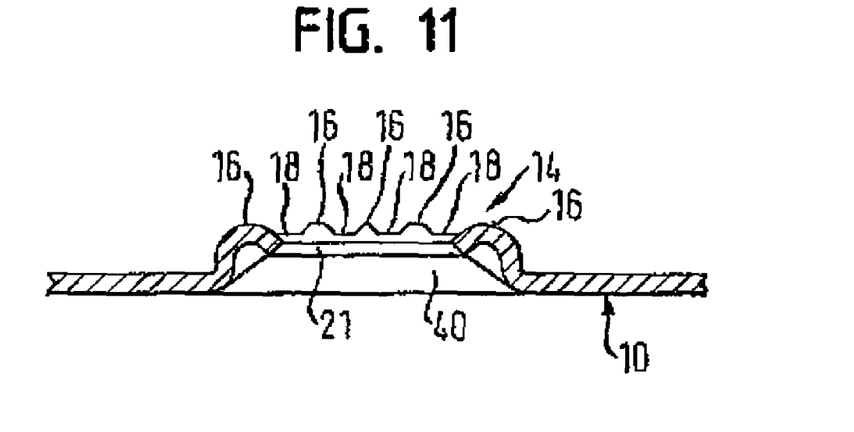

FIG. 11 shows an embodiment in which a conical ring collar 40 is formed of the sheet metal material 10 with a pierced hole which lies at the centre of the conical ring collar. Raised sheet metal regions 16 and recessed sheet metal regions 18 are present alternately at the conical surface of the conical ring collar 40 in a sequence alternating in ring-like manner around the pierced hole. It is known from the prior art to use such a conical ring collar 40 with an element, the rivet section of which is passed through the pierced hole coming from above. During the beading over of the rivet section of the fastener element the conical ring collar 40 is at least partly pressed flat whereby the diameter of the pierced hole become smaller and the material around the rivet bead is brought into a strangle-hold against the rivet section of the fastener element. This method is described in the European Patent EP-B-0539793 in connection with a so-called RSN element of the company Profil-Verbindungstechnik GmbH & Co. KG and indeed in association with fastener elements which do not have any features providing security against rotation or in connection with such elements which do have features providing security against rotation. With the layout on the sheet metal part in accordance with FIG. 11 an element without features providing security against rotation can be used. A high security against rotation can nevertheless be achieved and indeed without requiring an adhesive, although the provision of an adhesive would additionally be possible.

Self-piercing versions of a so-called RND element of the present applicant are already known, with the RND element itself being protected in EP-B-1116891. Here a self-piercing element which is used as a piercing plunger can also be used. In order to realize such an embodiment, which is basically also be possible in the other already mentioned examples the sheet metal part is performed in order to provide a ring collar with imprint 14 but without a pierced hole and the piercing of the sheet metal part is carried out by means of the rivet section of the functional element, for example as described in the initially named EP-B-1202834 B1 for the functional element 12.

Figure 12:
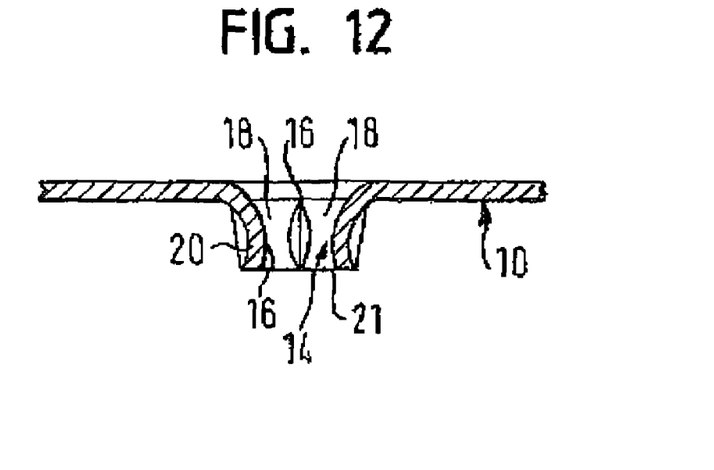

A further embodiment is shown in FIG. 12. Here the sheet metal part 10 is provided with a downwardly directed ring collar in this embodiment, with the imprint 14 not being provided in the direct transition region of the horizontal part of the sheet metal part into the downwardly directed ring collar but rather radially inside the ring collar. In this example, the imprint 14 again consists of elongate raised regions 16 and recessed or set back regions 18 arranged therebetween. An imprint of this kind can for example be used with a press-in element in the form of a so-called EBF bolt of the company Profil-Verbindungstechnik GmbH & Co. KG, in particular with a modified form of the EBF bolt which is itself formed without features providing security against rotation. The EBF bolt is for example described in the European patent specification EP 0678679 or in EP-B-0958100. Important in the embodiment of FIG. 12 is that on attachment of the EBF bolt to a sheet metal part 10 the shaft part of the bolt element is guided coming from above through the ring collar 20 and subsequently the sheet metal material is moved in the radial direction against the shaft part of the bolt element by the exertion of pressure on the head part of the bolt and by supporting the ring collar 20 in a corresponding conical recess or in a correspondingly shaped recess of a die button, whereby the ring collar is pressed into the thread turns of the bolt. In the present case the raised regions 16 lead to corresponding recesses in the thread region of the bolt over one, two or more thread terms. In this way a hooked engagement is achieved between the sheet metal material and the bolt element which produces the require security against rotation. I.e. when using the method of the invention, i.e. a sheet metal part in accordance with the invention with a press-in element the element is, contrary to the previous method of proceeding, deformed locally by the imprint in the sheet metal part, however no rivet process takes place which is why the term "press-in element" is justified.

In the embodiments of FIGS. 10 to 12 one sees that here also a complementary shaping is present at the side of the sheet metal part remote from the imprint. This is indeed almost always the case for some types of sheet metal, above all for thin sheet metals, the sheet metal part must not however be provided with such a complementary shape, providing adequate sheet metal material is present in the vicinity of the pierced hole of the intended pierced hole in order to achieve the imprint without shaping the side of the sheet metal part remote from the imprint.

Furthermore, it should be pointed out that the external outline for sheet metal parts which are shown in this application, for example in FIG. 1 or 3, has only been selected by way of example. It is frequently the case that this sheet metal part is a stamped part with a more complex external shape, whereby the stamped part can have a three-dimensional shaping and the imprint is only provided at the location where the attachment of a functional element is intended. It can also be expedient to provide the sheet metal part with a local recess, for example a circular recess in plan view, i.e. a circular recess in the sheet metal part and to provide the imprint in the base region of the recess.

An alternative method in accordance with the invention will now be explained in more detail with reference to FIGS. 13 and 14. As is evident from a comparison of FIGS. 13 and 14 the imprint 14 of the sheet metal part 10 is effected at its side facing the rivet bead and leads to the formation of a complementary imprint in the functional element in the region of the rivet bead. This complementary imprint can however not be directly recognized in FIG. 14 as a result of the section plane but is however only indicated by the regions shown in broken lines.

During the preparation of the sheet metal a raised formation which is at least substantially circular in plan view is produced in the sheet metal part by means of a correspondingly shaped punch and a complementary die button, with a hole 13 having a hole edge 52 being produced at the centre of the raised formation. At the side opposite to the raised formation the sheet metal surface approaches the hole edge 52 via a convex rounded portion 54 with the imprint 14 being provided in the region of this convex rounded portion. The sheet metal preparation is effected in such a way that the convex rounded portion 54 passes into a ring surface 58 lying in a plane which is parallel to the local plane 56 of the sheet metal outside of the raised formation.

At the side of the sheet metal part 10 adjacent to the formation 50 from which the rivet section 24 of the functional element 12 is passed through the hole 13, the top side of the sheet metal is provided with a convex rounded portion 60 which merges into a ring surface 62 which surrounds the hole 14 and lies in a plane 64 which stands parallel to the local sheet metal plane 66 outside of the raised formation 50.

Figure 13:
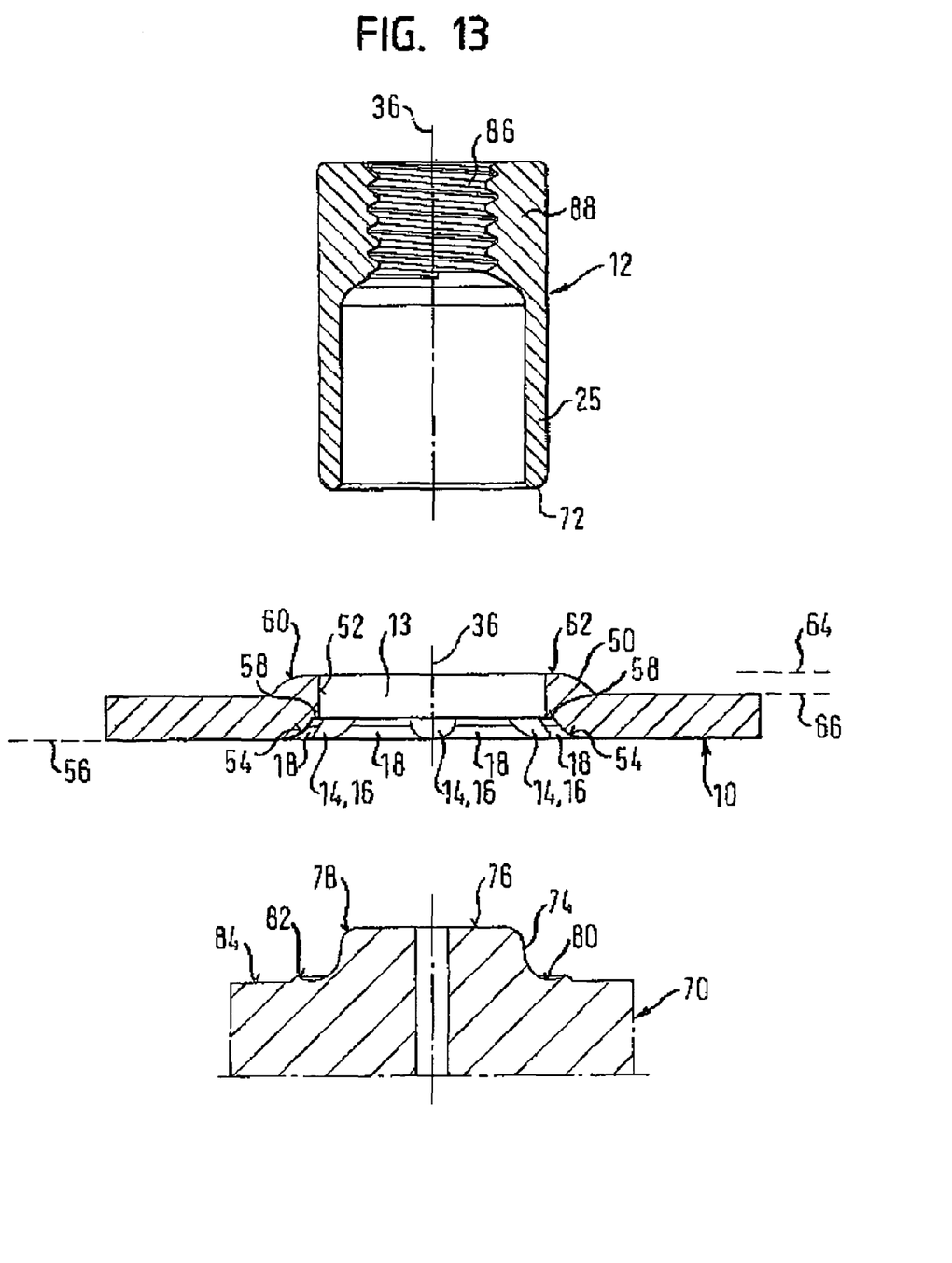

As is evident from FIG. 13, the imprint 14 is executed in order to form local recesses 16 in the ring-like convex rounded portion 54 which form the security against rotation between the rivet section and the sheet metal part.

The hole 13 is a circular hole which is preferably generated after or during formation of the raised portion in the sheet metal part by a piercing process and indeed with a cylindrical wall 52 which preferably stands perpendicular to the local sheet metal plane 56 or 66 outside of the raised formation 50.

Figure 14:
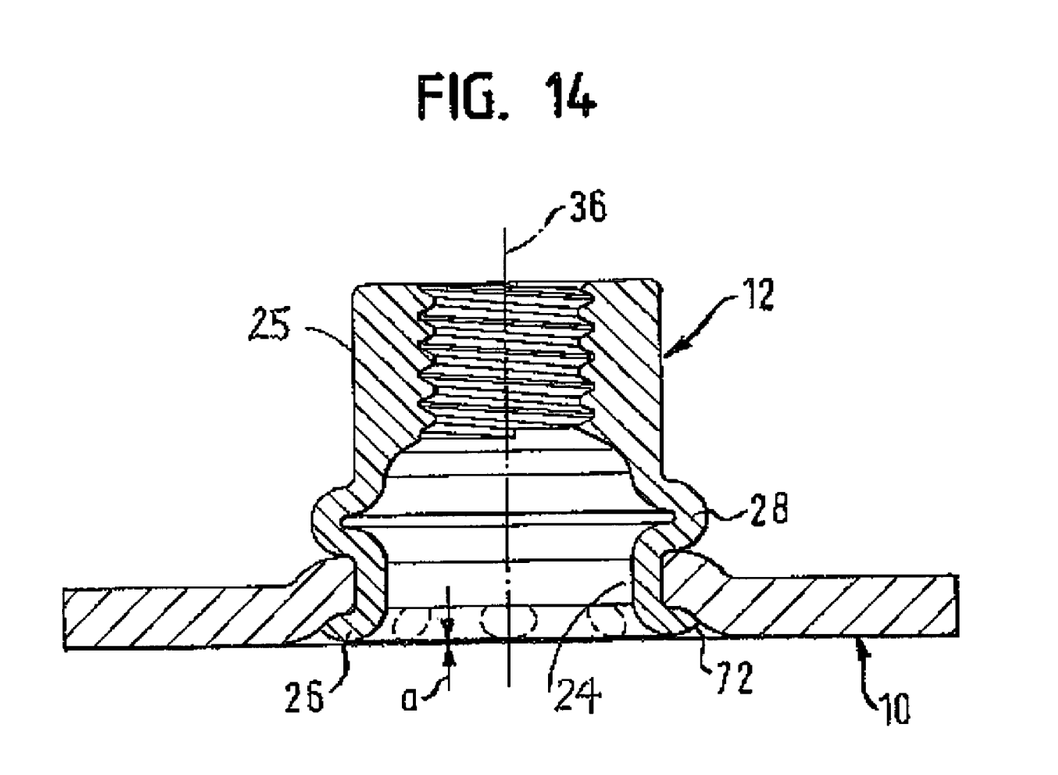

The rivet bead 26 of FIG. 14 is produced using the die button 70 of FIG. 13 by beading over the originally cylindrical rivet section 24 of the functional element 12 by about 90° related to the central longitudinal axis 36 of the functional element 12, i.e. of the hole 13. As a result, the free end face 72 of the rivet section points in the direction radially outwardly after the formation of rivet bead.

One notes that the rivet bead 26 at the side of the sheet metal part 10 opposite to the raised formation 50 does not project beyond the local plane 56 of the sheet metal part around the raised formation and is preferably slightly set back relative to this plane by a distance "a" in the range of a tenth of a millimeter.

The die button 70 of FIG. 13 has a central post 74 with an end face 76 which is rounded off at the peripheral edge 78. The central post 74 diverges starting from the rounded peripheral edge 78 slightly in the direction away from the end face 76 and merges into a rounded ring recess 80 which surrounds the post. The outer boundary edge 82 of the ring recess then merges via an inclined ring shoulder into a planar ring surface 84 of the die button, with the planar ring surface standing perpendicular to the longitudinal axis 36. During the formation of the rivet bead the rivet section 12, which has an outer diameter which corresponds to that of the pierced hole 13 (but can also be fractionally smaller or larger) is fed by a non-illustrated setting head through the hole 13 in the sheet metal part and pressed onto the post of the die button, whereby the rounded end 72 of the rivet section is slightly dilated by the post 74 and subsequently deflected in the region of the rounded recess 80 through 90° or somewhat more than 90°. As is customary during the attachment method for functional elements the die button is supported by the lower tool of a press or by intermediate plate of the press whereas the setting head is carried by an intermediate plate of the press or by an upper tool of the press. After the passage of the rivet section through the hole 13 of the sheet metal part, which is supported by springs at the lower tool of the press or at an intermediate plate of the press the setting head with the functional element and the sheet metal part are pressed downwardly during further closing of the press against the die button until, in a closed state, the ring surface 84 is pressed against the underside of the sheet metal part 10. The formation of the rivet bead has now been completed. During the deformation of the rivet bead the material of the rivet section is pressed by the action of the die button into the recesses 16 of which six are arranged around the longitudinal axis 36 of the functional element 12, whereby the complementary imprint at the rivet bead of the functional element arises and the desired security against rotation is achieved. Instead of supporting the die button by the lower tool of the press or by the intermediate plate and attaching the setting head to the intermediate plate or to the upper tool of the press respectively the die button can, in an inverted arrangement, be attached to the upper tool of the press or at an intermediate plate and the setting head can be installed at the intermediate plate or at the lower tool of the press respectively. A robot or a C-frame device with a power generating cylinder can also be used in order to move the element and the die button towards one another and to bring about the attachment of the element of a sheet metal part.

In contrast to the illustration of FIG. 2B no U-shaped rivet section is formed here at the lower side of the sheet metal. It extends solely in approximately a right angle towards the previously formed sheet metal which is provided with features generating security against rotation. This has, on the one hand, the advantage that the interlock at the rear side is not formed below the plane of the sheet metal and that, furthermore, the formation of the lower rivet bead is stopped by the sheet metal, so that the formation of the ring fold above the sheet metal plan is compulsorily initiated. In this way this arrangement is significantly less dependent on frictional or conditions within the die button than the previous method which is known from EP 1 202 834.

I.e., the formation of the ring fold or ring bead 28 is ensured here with relatively simple means in a clean sequence and with good quality, without having to take complicated measures such as a compulsory control of the movable parts of the die button. The fact that the lower side of the rivet bead 26 is slightly set back relative to the lower side of the sheet metal part (sheet metal plane 56) means that a further component can be straight forwardly screwed to the lower side of the sheet metal (by a bolt which engages into the thread 86 of the functional element 12) without special measures having to be taken in order to ensure a planar surface in the region of the rivet bead.

It is also evident from FIG. 14 that the cylindrical rivet section is crushed at the side of the sheet metal part associated with the raised formation into the ring fold 28 which traps the sheet metal part 10 in the region of the raised formation 50 between itself and the rivet bead 26.

Thus, through the method of the invention a component assembly (FIG. 14) results consisting of a sheet metal part 10 and the functional element 12 with the body part 25 with a tubular or cylindrical rivet section 24 formed thereon, with the free end 26 of the rivet section 12 being reshaped into a rivet bead which is present at the side of the sheet metal part 10 remote from the recess 50 and with the rivet section 24 being crushed at the side of the sheet metal part associated with the raised formation into a ring fold 28 which traps the sheet metal material 10 in the region of the raised formation 50 between itself and the rivet bead. The material of the rivet section 24 has been formed into the recesses 16 forming the imprint 14.

At this point it should be noted that the provision of an imprint 14 in the region of a rounded surface such as 54 is not necessarily required. The surface 54 could for example be a conical surface and the recesses could also be achieved by local raised formations or alternating with local raised formations in order to ensure the security against rotation. Also, instead of a convexly rounded surface 54 a concavely rounded surface could be provided, with the imprint then expediently being formed by local raised formations. All the previously explained possibilities for the design of the recesses and raised portions to achieve security against rotation can also be used here analogously.

Finally, the imprint 14 can be omitted completely, for example when the functional element is a ball pin, for example in accordance with the EP application 01989624.0, where no security against rotation is necessary or can be adequately ensured by friction. In a case such as this a component assembly consisting of the sheet metal part and the functional element is then present, with the functional element having a body part 25 with a tubular or cylindrical rivet section formed thereon such as 12 in FIG. 13, and the sheet metal part 10 having, as in FIG. 13, a raised formation which is at least substantially circular in plan view, with the hole 13 with the hole edge 52 being present at the centre of the raised portion and the sheet metal surface having a recess at the side opposite to the raised formation and approaching the hole edge via a convex, concave or obliquely set surface. The free end 26 of the rivet section 12 is then reformed into a rivet bead 26 which is present at the side of the sheet metal part remote from the recess 50, with the rivet section 12 being crushed into a ring fold 28 at the side of the sheet metal part associated with the raised formation, with the ring fold trapping the sheet metal part 10 in the region of the raised formation 70 between itself and the rivet bead 26 and with the rivet bead 26 not projecting beyond the local plane 56 of the sheet metal part around the raised formation at the side of the sheet metal part opposite the raised formation and preferably being slightly set back relative to this plane.

In this example, the functional element is preferably a ball pin (not shown) in accordance with the said EPO 1989624.0 with a spherical body part which merges via a shaft part into the tubular rivet section, with the length of the rivet section preferably being dimensioned adequately long in order to form the rivet bead, the axial part of the rivet section in the sheet metal part and the ring fold, without exceeding this adequate length by more than about 10%.

Alternatively, the functional elements can be a fastener element having a body part 25 with an internal thread 82 or an external thread which merges directly or indirectly via a shaft part onto the tubular rivet section, with the length of the rivet section preferably dimensioned to be adequately long in order to form the rivet bead, the axial component of the rivet section and the sheet metal part and the ring fold without exceeding this adequate length by more than about 10%. If the security against rotation by friction alone is not sufficient here then an adhesive, for example an adhesive which cures under pressure, can be used in the region of the rivet connection between the functional element and the sheet metal part. Here also the design of the rivet connection in accordance with FIG. 14 (but without the imprint 14) leads to the advantage that the further component can be straight forwardly secured to the underside of the sheet metal part so that the rivet bead does not project beyond the lower side of the sheet metal.

The method of the invention can be used not only with sheet steel but also with other sheet metal types, for example aluminum sheets or with magnesium panels. The material of the functional element is then normally elected in matched manner and all the materials can be considered for the fastener elements which are customary nowadays.

In all embodiments all materials can be named as an example for the material of the functional elements which in the context of cold deformation achieve the strength values of class 8 in accordance with the ISO standard or higher, for example a 35B2 alloy in accordance with DIN 1654. The so formed fastener elements are suitable amongst other things for all commercially customary steel materials for deep drawn sheet metal parts, such as also for aluminum or its alloys. Also aluminum alloys, in particular those of higher strength can be used for the functional elements, for example AlMg5. Also the functional elements of higher strength magnesium alloys such as for example AM50 can be considered.

The invention claimed is:

1. A method for the manufacture of a component assembly comprising a sheet metal part (10) and a metal fastener element (12) attached to it by a riveting process or by a riveting and piercing process or by a press-in process, wherein the sheet metal part is provided with an imprint (14), wherein the imprint (14) is produced prior to attachment of the metal fastener element (12) and consists of a sequence (15) of regions (16, 18) which are raised and recessed relative to one another and wherein, during the attachment of the metal fastener element, it is pressed against the sheet metal part (10) in such a way that the imprint (14) of the sheet metal part leads to a complementary shaping of the metal fastener element in a region of the metal fastener element which comes into contact with the imprint (14).

2. A method in accordance with claim 1, wherein the sequence (15) is ringlike.

3. A method in accordance with claim 1, wherein the sequence is polygonal.

4. A method in accordance with claim 1, wherein the sequence (15) consists of elevated regions (16) which lead to recesses in the metal fastener element and of surface regions (18) recessed relative to the raised regions which lead at least substantially to no deformation at the metal fastener element (12).

5. A method in accordance with claim 1, wherein the sequence (15) consists of the recessed regions (18) which lead to raised formations at the metal fastener element and of surface regions (16) which are raised relative to the recessed regions (18) which lead to substantially no deformation of the metal fastener element.

6. A method in accordance with claim 1, wherein the sequence (15) consists of raised regions (16) which lead to recesses in the metal fastener element (12) and of regions (18) recessed relative to the raised regions which lead to raised formations at the metal fastener element.

7. A method in accordance with claim 6, wherein the sequence (15) consists of raised regions (16) which lead to recesses in the metal fastener element, of regions (18) recessed relative to the raised regions (16) which lead to raised formations of the metal fastener element and also of intermediate regions (17) which lead to at least substantially no deformation at the metal fastener element.

8. A method in accordance with claim 1, wherein the imprint (14) is so executed that a ring collar (20) of sheet metal material arises and the sequence is formed in the region of the transition (22) of the sheet metal material into the ring collar (20).

9. A method in accordance with claim 1, wherein the imprint (14) is formed in the region of the radially inner side of a conical recess (24) in the sheet metal.

10. A method in accordance with claim 1, wherein the sheet metal part (10) is selected to have a lower strength than the metal fastener element (12).

11. A method in accordance with claim 1, wherein the sheet metal part (10) is selected to have a higher strength than the metal fastener element (12).

12. A method in accordance with claim 1, wherein the sheet metal part (10) is selected to have at least substantially the same strength as the metal fastener element (12).

13. A method in accordance with claim 1, wherein the metal fastener element is secured to the sheet metal part by a rivet bead (26), wherein the imprint (14) of the sheet metal part (10) is effected at its side adjacent to the rivet bead (26) and leads to the complementary shaping of the metal fastener element (12) in a region (28) of the metal fastener element (12) at the rivet bead (26), said rivet bead (26) forming the region (28) of the metal fastener element.

14. A method in accordance with claim 13, wherein a raised formation (50) is effected in the sheet metal part which is at least substantially circular in plan view, with a hole having a hole margin (52) being produced at the centre of the raised formation (50) and wherein the sheet metal surface approaches the hole margin (52) at the side opposite to the raised portion (50) via a convex rounded formation (54), with the imprint (14) being provided in the region of this convex rounded formation (54).

15. A method in accordance with claim 14, wherein the sheet metal part is prepared so that the convex rounded formation (54) merges into a ring surface lying in a plane parallel to the local plane of the sheet metal (56) outside of the raised formation.

16. A method in accordance with claim 14, wherein the sheet metal side is provided at the side of the sheet metal part adjacent to the raised formation (50) from which the rivet section (24) of the metal fastener element is passed through the hole (13) with a ring-like surface having a convex rounded shape (60) which merges into a ring surface (62) which surrounds the hole (13) and lies in a plane (64) which is parallel to the local sheet metal plane (26) outside of the raised portion.

17. A method in accordance with claim 14, wherein the imprint (14) is executed in order to form the local recesses (16) in the convex rounded formation (54) forming the security against rotation between the rivet section and the sheet metal part.

18. A method in accordance with claim 14, wherein the hole (13) is a circular hole with a cylindrical wall (52) which stands perpendicular to the local sheet metal plane (56, 66) outside of the raised formation.

19. A method in accordance with claim 13, wherein the rivet bead (26) is formed by beading over an originally cylindrical rivet section (24) of the metal fastener element (12) through about 90° related to the central longitudinal axis of the metal fastener element or of the hole.

20. A method in accordance with claim 13, wherein the sheet metal part has a raised formation (50) and wherein the rivet bead (26) does not project beyond the local plane (56) of the sheet metal part around the raised formation (50) at the side of the sheet metal part opposite to the raised formation (50).

21. A method in accordance with claim 20, wherein said rivet bead is set back relative to said local plane (56).

22. A method in accordance with claim 14, wherein the cylindrical rivet section (24) is crimped at the side of the sheet metal part associated with the raised formation (50) to form a ring fold (28), which traps the sheet metal part (10) between itself and the rivet bead (26) in the region of the raised formation (50).

* * * * *